Aug. 21, 1951     W. L. BURNS ET AL     2,565,350
THERMOSTATIC CONTROL FOR CHEMICAL PLANTS
Filed June 22, 1948     4 Sheets-Sheet 1

Inventors:
William Lindsay Burns
Alfred Charles Bureau
by Pennie, Edmonds, Morton and Barrows
Attorneys Aug. 21, 1951  W. L. BURNS ET AL  2,565,350
THERMOSTATIC CONTROL FOR CHEMICAL PLANTS
Filed June 22, 1948  4 Sheets-Sheet 2

Inventors:
William Lindsay Burns
Alfred Charles Bureau
by
Pennie, Edmonds, Morton and Barrows
Attorneys Aug. 21, 1951 W. L. BURNS ET AL 2,565,350
THERMOSTATIC CONTROL FOR CHEMICAL PLANTS
Filed June 22, 1948 4 Sheets-Sheet 3
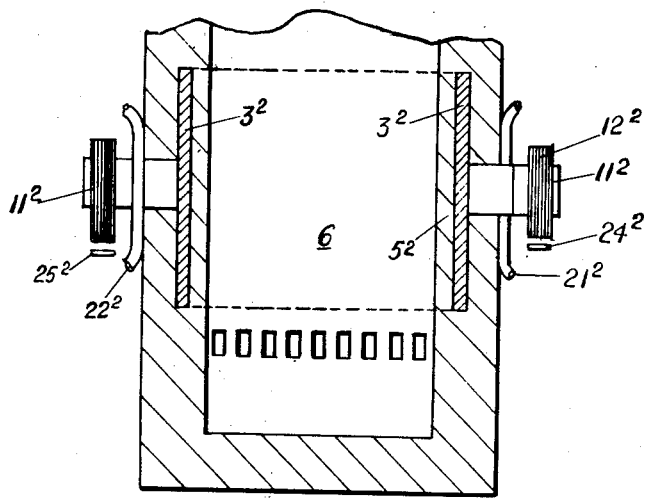
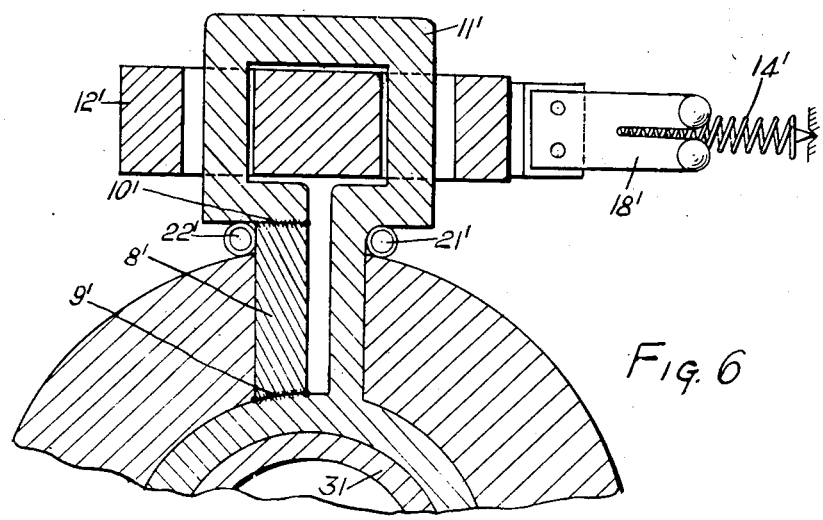

Patented Aug. 21, 1951

2,565,350

UNITED STATES PATENT OFFICE 2,565,350

THERMOSTATIC CONTROL FOR CHEMICAL PLANTS

William Lindsay Burns and Alfred Charles Bureau, Leven, Fife, Scotland, assignors to Henry Balfour & Co. Limited, Leven, Fife, Scotland, a corporation of Great Britain and Northern Ireland Application June 22, 1948, Serial No. 34,468
In Great Britain May 13, 1948

4 Claims. (Cl. 236—15)

The object of this invention is to effect automatic control of plants in which a chemical reaction takes place between media some of which support combustion or/and chemical reaction. It has been found in many cases that manual control of regulating devices associated with such plants is unreliable, and that automatic control, such as described, for example, in the specification of the prior United States patent application No. 617,242 filed September 19, 1945, now abandoned, based on the temperature of the gases, before and after the reaction, is in certain cases at least impracticable because of the small difference of temperature of the gaseous media at the different phases of operation of the plant. A chemical plant in which automatic control is a desideratum may be, for example, a gas producer or a water gas producer, an oxygen producer or a $CO_2$ producer.

Direct thermostatic control dependent on the temperature at the point where combustion or the reaction takes place would be convenient except for the difficulty arising from the circumstance that, as the reacting solid medium (coal or coke, for example) is gradually consumed, the zone of highest temperature is displaced as consumption proceeds, whereas, when the combustion chamber is re-charged with reacting medium, the zone of highest temperature will be in another position differing from the previous one. A pyrometer or other immersion temperature control device would interfere with the free gravity advance of the reaction product and with the stoking of the combustion chamber.

This invention relates to means whereby to effect thermostatic control of the sequence of reactions in the combustion chamber or reaction chamber of a chemical plant in which the heat of reaction is produced by allowing one group of the reactive media to react until the desired reaction temperature is attained. After the predetermined temperature is reached, a change in the reaction sequence is effected by the actuation of regulating devices influenced by temperature-sensitive elements responding to the average temperature of the reaction zone, and acting through electrical, mechanical or hydrostatic means, allowing any number of regulating sequences to be effected in the course of the reaction. Thus, if the temperature of the reaction zone is falling and the reaction has to be boosted up, this is achieved by the intervention of regulating devices responding to the minimum temperature of the reaction zone, and thus promoting the reaction as to bring about an increase of temperature until the maximum temperature is reached, the said temperature-sensitive elements being so arranged that the reaction is independent of the displacement of the reaction zone of highest temperature.

Broadly, the invention consists of a system of thermostatic control responsive to the average temperature of a reaction chamber or combustion chamber, having a predetermined relation to the reaction temperature, and acting on regulating devices that control the reaction gas or fluids or combustion boosting equipment, or other operating means.

In a preferred embodiment of the invention as applied to a gas producer, the temperature responsive elements, such as thermocouples, are evenly distributed over at least one plate of heat-resisting metal embedded in the refractory brickwork of the combustion chamber the hot points of said thermocouple being electrically insulated from but in thermal junction with said plate; said plate embracing at least a substantial part of the perimeter of the combustion chamber in the region of the reaction zone of the fuel bed, the vertical dimension of the plate being greater than the maximum fluctuation in the level of the reaction zone of the fuel bed. If the thermocouples are connected in series, the resulting electro-motive force will then be proportional to the average temperature of the plate, which average temperature depends, in turn, on the average temperature of the reaction zone of the fuel bed.

Fluctuations in the level of the reaction zone of the fuel bed or of the location of the point of maximum temperature do not affect the average temperature of the plate, as said plate extends above and below the upper and lower limits of said reaction zone, and substantially encircles said zone, and the heat from said zone has the same horizontal distance to travel to reach the plate irrespective of the level of said zone, or the location of the point of maximum temperature, thereby ensuring that the average temperature of the plate is correlated to the temperature of said reaction zone.

Two ends of the thermocouples, in series, may be connected to a conventional drop contact millivoltmeter or to a bridge compensator provided with contacts. The contacts are so arranged that at a minimum temperature, which is necessary to maintain combustion of the fuel, the boosting elements are brought into action until a maximum temperature is reached when the combustion action is discontinued and the chemical reaction is started until minimum temperature is again achieved. The regulating devices, above referred to, may be valves each dependent for its operation on the actuation of one of said contacts. Between these two contacts any number of intermediate contacts can be provided for the individual operation of additional valves.

It is obvious that a thermionic valve could be used to amplify the thermo-current resulting from the thermocouples, the output of the thermionic valve operating a conventional relay or other contact device.

The plate constitutes a metallic body of large area which is protected from erosion and which does not obstruct the downward passage of the fuel or reacting material in the combustion chamber. Actually, the temperature of the plate is considerably less than the maximum temperature of the said reaction zone of the fuel bed, as it is inset in refractory brickwork, so that the life of the plate is not liable to be unduly shortened by overheating.

In order that the invention may be clearly understood and readily carried into effect, a number of constructions in accordance therewith will now be described, by way of example, with reference to the accompanying drawings in which—

Fig. 6 is a section on the line A—B of Fig. 5 showing a direct acting thermo-electric relay.

Fig. 7 is an arrangement drawing and Fig. 8 is an electric wiring of a direct acting relay.

Figure 1:
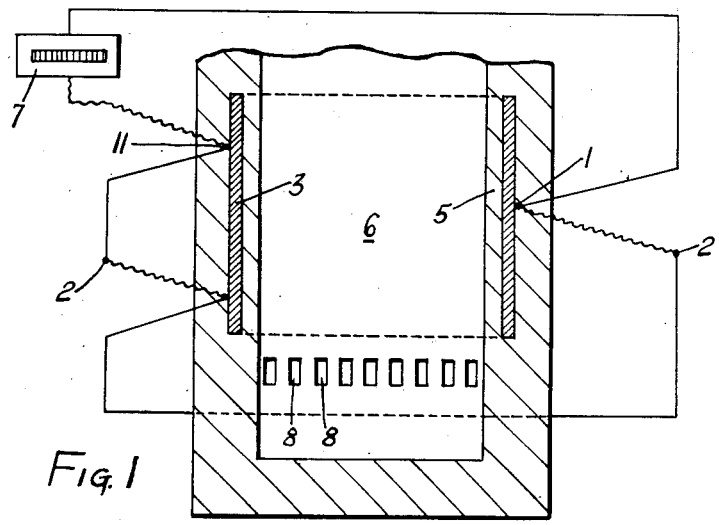
Fig. 1 is a vertical section and Fig. 2 is a sectional plan of a gas generator with metallic plates of arcuate section embedded in a cylindrical wall portion of the combustion chamber of a water gas plant.
Figure 2:
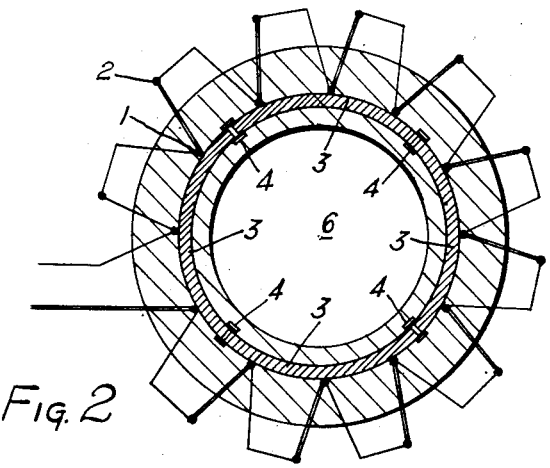
Figure 3:
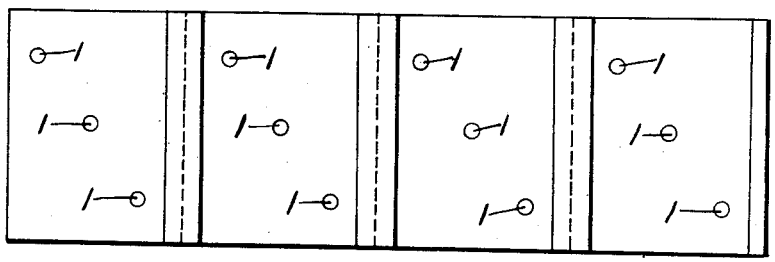
Fig. 3 is a development of the conducting metal plates.

In Figs. 1 to 3 are shown a number of thermocouples in which 1 are the hot junctions electrically insulated from but in thermal junction with the conducting metal plates 3; 2 are the cold junctions. The conducting metal plates 3 are connected by joints 4 of the same metal and inset in the refractory brickwork 5 lining the combustion chamber at a position around, above and below the point of maximum temperature of the fuel bed 6. 7 is a contact millivoltmeter. 8 denotes outlets. The cold junctions are water-cooled or so otherwise disposed that they are not influenced by the furnace temperature.

Figure 4:
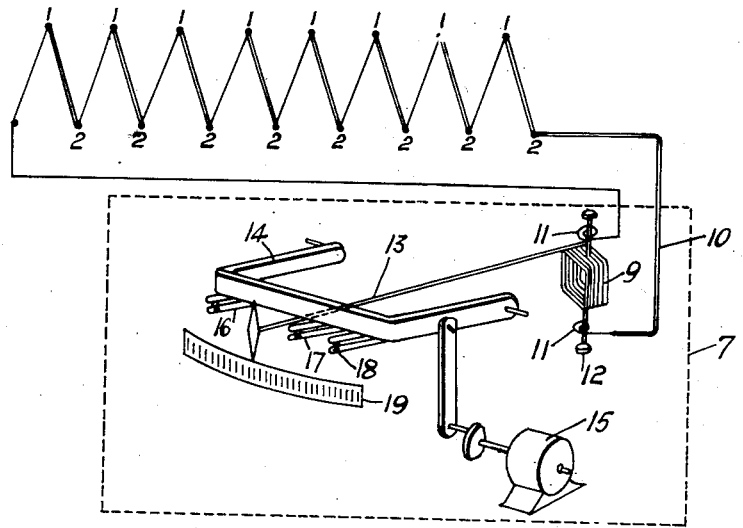
Fig. 4 is a schematic drawing of the electrical connections of the thermocouples and the contact instrument.

In Fig. 4, 7 is a contact millivoltmeter, in which 9 represents a moving coil (the permanent magnet is not shown) electrically connected in series to the hot junctions 1 and the cold junctions 2 of a number of thermocouples by a conductor 10. 11 denotes spiral springs which are connected to the moving coil. 12 are bearings. 13 is the pointer. 14 is a dropbridge which is periodically dropped on to the pointer 13 by a synchronous motor 15. 16, 17 and 18 are contacts which are actuated when the pointer is in alignment with any of the contacts and the dropbridge 14 presses the pointer against it. 19 is a scale for visual reading of the temperature.

Figure 5:
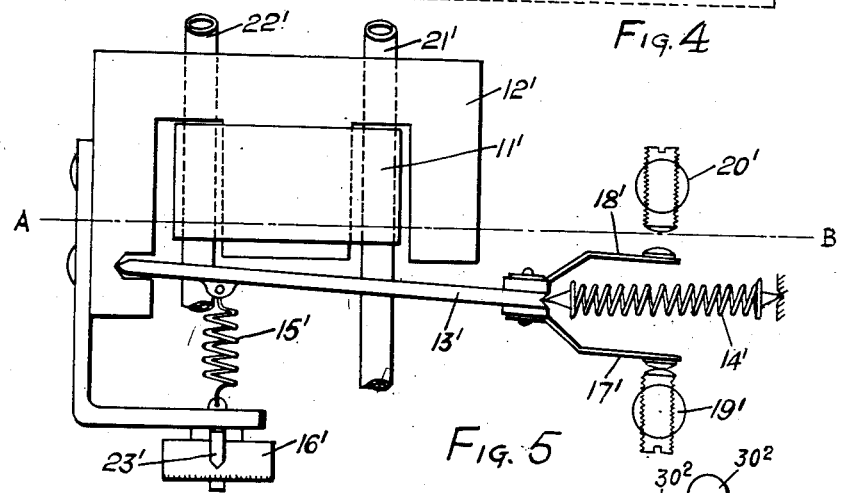
Fig. 5 is an elevation.

In Figs. 5 and 6, $3'$ are conducting copper plates. $8'$ is a Constantan bar welded to the copper plate $3'$ at $9'$. $10'$ is the point where the bar is welded to a single copper coil $11'$. $12'$ is an iron stator of M form. $13'$ is a relay arm fitted with a snap action spring $14'$ and tension spring $15'$ which is adjusted at $16'$. Double contacts $17'$ and $18'$ are mounted insulated on an arm making contact with stationary contacts $19'$ and $20'$. $21'$ and $22'$ are water cooling tubes brazed to the single coil $9'$. $23'$ is a pointer.

In order better to illustrate the operation, some numerical values are given as an example. This thermocouple will generate an E. M. F. of twenty-eight millivolts if the plate $3'$ is at 500° C., and the water-cooled end $10'$ is at 20° C. If the plate reaches 850° C., the E. M. F. will reach thirty-six millivolts. The difference of eight millivolts and 500 amperes will produce four watts of electrical energy to drive the relay. The high current explains the large section provided.

In Fig. 7, $3^2$ are the metal plates set in the refractory brickwork $5^2$ lining the combustion chamber at a position around, above and below the point of maximum temperature of the fuel bed $6^2$. $11^2$ is a copper coil and $12^2$ is an iron stator of M form. $21^2$ and $22^2$ are water cooling tubes. $24^2$ and $25^2$ are relay arms.

Figure 8:
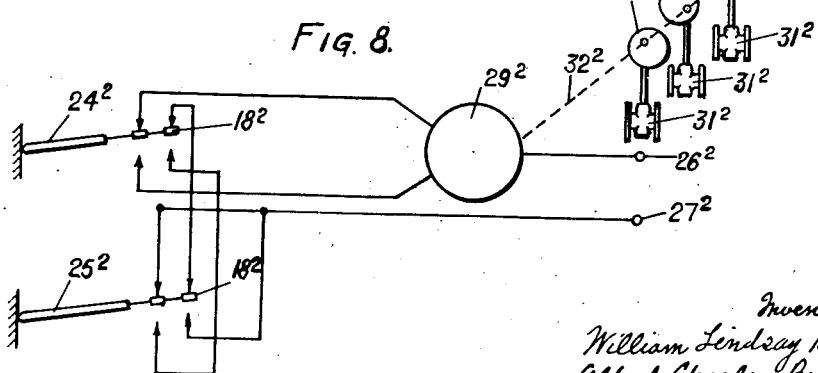

In Fig. 8, $24^2$ and $25^2$ are the two relay arms, the contacts $18^2$ being wired according to the drawing, controlling a torque motor $29^2$ which imparts an angular movement to the shaft $32^2$ which turns counter-clockwise for opening, and clockwise for closing the valves $31^2$. Eccentrics $30^2$ can be so adjusted that the valves will open or close in any perdetermined angular position of the torque motor. $26^2$ and $27^2$ are the electric mains supply connections. The spring tension in Fig. 5 can be so adjusted that the relays actuate the contacts at different temperatures.

Figure 9:
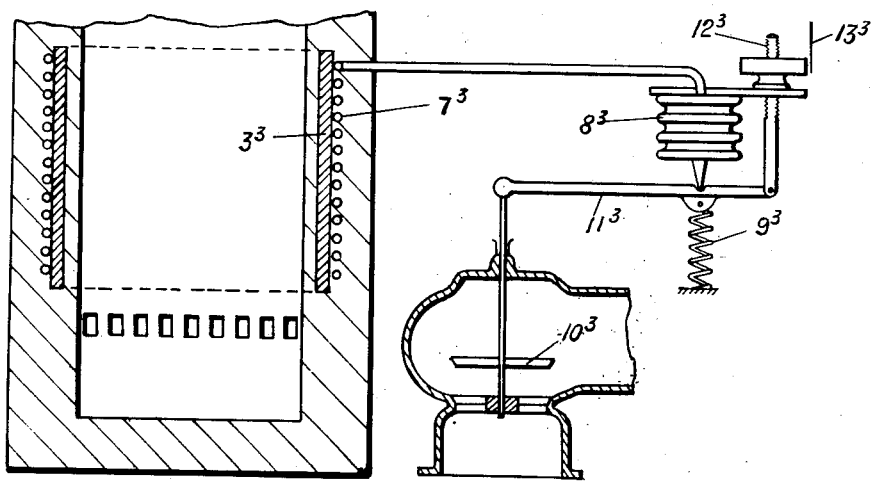
Fig. 9 is a section and arrangement of a fluid-actuated thermo-regulator.

In Fig. 9, $7^3$ is a steel capillary spiral wound and welded or brazed to the plate $3^3$. $8^3$ is a steel bellows; $9^3$ is a compression spring acting against the bellows. The capillary and bellows are filled with mercury or the like. $10^3$ is a valve directly controlled by the arm $11^3$. $12^3$ is a position-adjusting screw, and $13^3$ is an indicator. A number of bellows, similar to $8^3$, can be connected with the tube $7^3$ and a required number of valves, similar to $10^3$, can be used. By adjusting the screw $12^3$ the valve can be made to operate at any set temperature.

Figure 10:
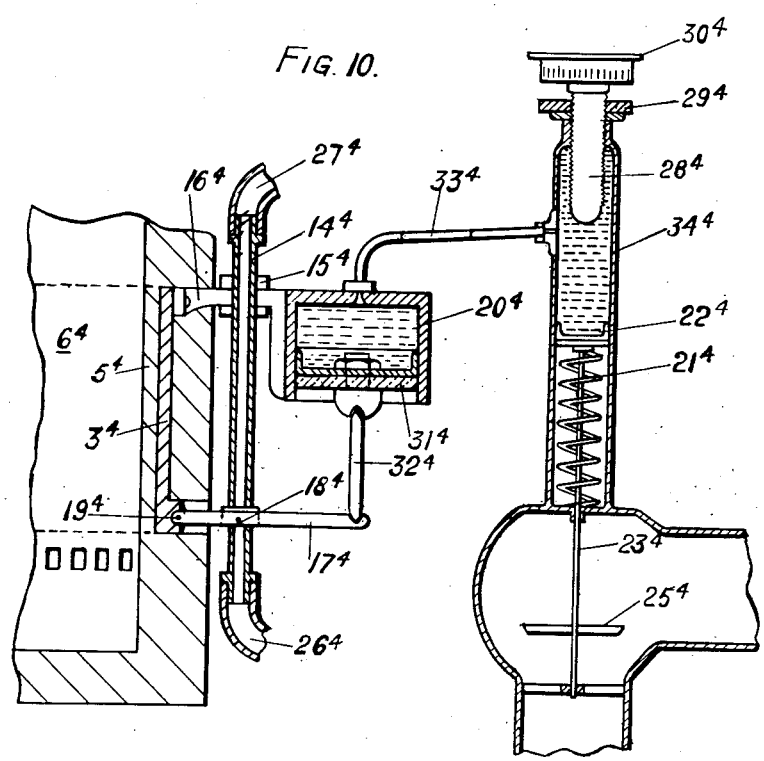
Fig. 10 is a section and arrangement of a solid expansion type thermo-regulator with fluid remote valve operation.

In Fig. 10, the plate $3^4$ is composed of an alloy with a high expansion coefficient, such as certain nickel iron alloys, set into the refractory brickwork $5^4$ lining the combustion chamber at a position around, above and below the point of maximum temperature of the fuel bed $6^4$. $14^4$ is a hollow bolt of very low expansion coefficient, such as Invar, fixed at $15^4$ to a bracket $16^4$ joined to the plate $3^4$. $17^4$ is an arm pivoted at the pin $18^4$, and connected with the plate $3^4$ at $19^4$. A cylinder $20^4$ contains a fluid such as oil or kerosene. $31^4$ is a piston in the cylinder $20^4$ mechanically connected with the arm $17^4$ through the strut $32^4$. $33^4$ is a connecting pipe between the cylinder $20^4$ and a cylinder $34^4$ containing a piston $22^4$. $21^4$ is a spring thrusting against the piston $22^4$. The stem $23^4$ is connected with the piston $22^4$ and valve $25^4$. $26^4$ and $27^4$ are the entrance and the exit for water cooling. $28^4$ is a plunger screw to adjust the position in which valve $25^4$ should open and close. $29^4$ is a locknut to keep the screw $28^4$ in position after being adjusted. $30^4$ is an adjusting head. When the combustion chamber is heated, the plate $3^4$ will reach a temperature which will cause the plate $3^4$ to expand. The hollow bolt $14^4$ being made of very low expansion coefficient, the arm $17^4$, being able to pivot at shaft $18^4$, will move in the direction to lift the piston $31^4$. Consequently, the hydraulic fluid contained in the cylinders $20^4$ and $34^4$ passing through the communicating pipe $33^4$ will depress the piston $22^4$ against the spring $21^4$, thus moving the stem $23^4$ downwards with the valve $25^4$, closing said valve against its seat; by unscrewing the head $30^4$ which raises the plunger screw $28^4$ from the fluid, it can be achieved that the valve $25^4$ will correspond to a certain position of the piston $31^4$, which position again will depend on the degree of expansion of the plate $3^4$ corresponding again to a certain temperature.

By applying a number of similar arrangements a number of valves can be operated in varying correlation to one another.

What is claimed is:

1. The combination of a chamber having a wall of refractory material, a mass of metal embedded in said material and surrounding a selected zone of said chamber, heat sensitive elements electrically insulated from but in thermal junction with said mass of metal, and a regulating device influence by said elements and serving to control the flow of at least one reactive medium to said chamber.

2. The combination of a chamber having a wall of refractory material, means for conducting at least one reactive medium into said chamber, a mass of metal embedded in the material of the wall and surrounding a selected zone in said chamber, heat sensitive elements electrically insulated from but in thermal junction with said mass of metal, and a regulating device for controlling the flow of the reactive medium in said conducting means, said regulating device being responsive to said heat sensitive elements.

3. In an apparatus for carrying out reactions including a reaction chamber having refractory material defining a reaction zone in which reactions are adapted to be carried out, the improvement comprising a mass of metal mounted in the refractory material defining the reaction zone of the chamber and embracing a substantial part of the perimeter of the reaction zone of the chamber, said mass of metal extending at least the full length of the reaction zone in the chamber, a plurality of heat sensitive elements each electrically insulated from but in thermal junction with said mass of metal, the points of junction of the element with said mass of metal being distributed over the mass of metal, and a control means interconnected with and responsive to said plurality of heat sensitive elements.

4. The combination of a chamber having a wall of refractory material, a mass of metal embedded in the material of said wall and surrounding a selected zone in said chamber, means sensitive to the average temperature of said mass of metal, and a regulating device influenced by said temperature sensitive means and serving to control the flow of at least one reactive medium to said chamber.

W. LINDSAY BURNS.
ALFRED CHARLES BUREAU.

REFERENCES CITED

The following references are of record in the file of this patent:

UNITED STATES PATENTS

| Number | Name | Date |
| --- | --- | --- |
| 867,560 | Currey | Oct. 1, 1907 |
| 997,187 | Fournier | July 4, 1911 |
| 1,207,537 | Gilbert | Dec. 5, 1916 |
| 1,331,553 | Amthor | Feb. 24, 1920 |
| 1,839,091 | Eule | Dec. 29, 1931 |
| 2,015,838 | Borden | Oct. 1, 1935 |
| 2,413,128 | Wills | Dec. 24, 1946 |

FOREIGN PATENTS

| Number | Country | Date |
| --- | --- | --- |
| 373,503 | France | Mar. 19, 1907 |
| 420,364 | Great Britain | Nov. 19, 1935 |